UNITED STATES PATENT OFFICE.

FREDERICK D. CRANE, OF MONTCLAIR, NEW JERSEY.

METHOD OR PROCESS OF TREATING LIQUIDS.

1,223,153.      Specification of Letters Patent.      Patented Apr. 17, 1917.

No Drawing.      Application filed January 8, 1917. Serial No. 141,068.

*To all whom it may concern:*

Be it known that I, FREDERICK D. CRANE, a citizen of the United States, and a resident of Montclair, in the county of Essex and State of New Jersey, have invented certain new and useful Improvements in Methods or Processes of Treating Liquids, of which the following is a specification.

My invention relates to the treatment of volatile, inflammable, or otherwise dangerous or objectionable liquids in order to reduce the danger or inconvenience incident to their storage, transportation, or use; and the object thereof is to provide an improved method or process of treatment whereby such liquids may be solidified, as it were, and transported, stored or used as solid substances from which, however, the liquids may be readily recovered and used as liquids, or, and as an obvious alternative, the solid substance may be used in that form, and without recovering the liquid therefrom as such, in certain cases where such a use is possible or desirable.

Various liquids have heretofore been solidified, so to speak, and used in the solid form, as an example of which the familiar "solid alcohol" of commerce may be cited. In such processes as have heretofore been used for accomplishing that end, however, a considerable quantity of water has been present in the solid mass; the water having been either added as an ingredient necessary to the carrying out or working of the processes, or the result of chemical reactions which take place during the processes which results in the solidification of the liquid. In either case the solid mass contains much water and, if the liquid is to be recovered and used as such (which, however, has heretofore been unusual, the solidified liquid having been commonly used as a solid), the liquid will be contaminated with the water present in the solid mass, which is a feature of obvious disadvantage in many if not in all cases.

As distinguished from prior processes, my improved method or process is one in which no water is added in performing the process, and one in which no water is produced as the result of chemical action during the performance of the process. The solid mass produced in the working of my improved process is therefore anhydrous, and the liquid recovered from the solid mass after transportation or when it is to be used as such, contains no water. My process, therefore, is particularly adapted to the treatment of liquids which it is desirable to ultimately recover and use in the liquid form, because the recovered liquid is unmixed with or contaminated by water; whereas prior processes have been unsuitable for such purposes, for the liquid, if recovered from the solid mass (which to be sure may be done) will be mixed with a considerable quantity of water; which will in many cases seriously interfere with the use of the recovered liquid in the liquid form and necessitate a separate treatment thereof to separate it from the water with which it is mixed, if the liquid is to be used as such and in the liquid form.

Broadly speaking, my invention consists in dissolving a suitable fatty acid or mixture of fatty acids in the liquid to be solidified for transportation, storage, or use, and adding a suitable alcoholate dissolved, commonly, in the alcohol from which it is derived, to the solution first formed, whereby a jelly-like and more or less solid mass is produced; which mass contains no water, and throughout which the liquid treated is distributed and held in suspension, as it were.

In the performance of my process the liquid product produced in the chemical action which takes place, is alcohol of the kind from which the alcoholate used is derived or produced. The quantity of such alcohol present in the final product, however, is extremely small; and, while the same is present in the recovered liquid, it will in most cases be entirely unobjectionable and will in no way interfere with the use of the recovered liquid in the liquid form; furthermore, the alcohol present may be readily separated from the liquid treated by fractional distillation, or otherwise, and a pure and uncontaminated liquid recovered from the solid mass for use as such, if such a course is necessary or desirable.

My improved process is applicable to many liquids and mixtures of liquids which are dangerous or troublesome to transport, store, or deal with in the liquid form, among which may be mentioned gasolene and similar hydrocarbons; methyl, ethyl, and other alcohols; benzol; toluene; benzene; acetone; chloroform; ether; carbon tetrachlorid; carbon bisulfid, etc.; although I at present contemplate its use principally in the transportation of and the recovery for use in the liquid form of gasolene, kerosene, and similar hydrocarbons, commercial or denatured ethyl alcohol, and the alcohol-ether mixture used for dissolving nitrocellulose.

In carrying out my process in its preferred form I first dissolve stearic acid, or similar fatty acid, in the liquid to be treated and solidified, say gasolene or alcohol, the quantity of acid used depending upon the degree of hardness to be secured in the solid mass ultimately produced; and depending also, to a lesser extent, upon the character of the liquid to be transported; as some liquids require the use of a larger quantity of the acid than others in order to secure a predetermined degree of hardness. This step is not chemical, that is, is not accompanied by chemical action, and the quantity of the acid which a particular liquid will dissolve will obviously vary from a small amount to the quantity necessary to form a saturated solution, and vary also in the case of different liquids to be solidified. Generally speaking, the greater the quantity of acid dissolved in the liquid treated, the harder will be the solid mass produced in performing the process. This step of my process may be performed in any suitable receptacle such as a vat or tank, or it may be performed directly in the barrel, cask, drum, can or other container in which the liquid treated is to be transported or stored; and it will be appreciated that heat may be applied to the liquid to be solidified, if deemed necessary or desirable, in order to facilitate the solution of the acid therein; and that the same may be subjected to pressure in order to prevent vaporization thereof, if an extremely volatile liquid is to be treated.

Having thus produced a solution of stearic or similar acid in the liquid to be solidified, I add to such solution a solution of an alcoholate in the alcohol from which it is formed, which solutions, upon being mixed and stirred to produce uniform distribution of one throughout the other, react chemically and produce a jelly-like mass throughout which the liquid treated is distributed and held; which mass hardens upon cooling, the hardness of the final product being, as explained, dependent upon the quantities of the ingredients used, and dependent also to some extent upon the characteristics of the liquid operated upon. The quantity of alcoholate solution used is ordinarily so chosen that there will be no excess of it, or of the acid used, after the chemical reaction which takes place upon mixing the two solutions has taken place.

Although I have performed my process by using various alcoholates, I prefer to use sodium ethylate for accomplishing the solidification of the liquid to be treated. This ingredient is preferably made at the place where the process is to be worked by adding metallic sodium, or sodium hydroxid, to ethyl alcohol, the alcohol being commonly in excess of the amount required to form the ethylate, so that the resulting product is in solution in the excess alcohol. If the alcohol used is anhydrous, and if metallic sodium is used, then an anhydrous solution of sodium ethylate in ethyl alcohol is secured; if on the other hand sodium hydroxid is used in the preparation of the alcoholate, then a small quantity of water is produced, and if the alcohol is not anhydrous more water is of course present. I am, however, able to accomplish a satisfactory solidification of all liquids thus far experimented upon by the use of about 4% of stearic acid and sodium ethylate together, and, as ethyl alcohol containing under 5% of water is not unusual, it will be appreciated that while some water may in the practical working of my process be added to the liquid being treated and present in the final product, the quantity of water thus added and present is extremely small, and may be disregarded for all practical purposes.

The two solutions upon being mixed combine chemically, as explained, the resulting products being sodium stearate and ethyl alcohol. The sodium stearate is insoluble in the liquid being solidified, and forms the jelly-like mass referred to; while the liquid treated and the ethyl alcohol produced in the reaction, as well as the excess thereof in which the sodium ethylate was dissolved, are distributed throughout and held in suspension in the said mass; and it will be appreciated that the solidified product is substantially anhydrous, as practically no water is added to the liquid treated by the process, and none is produced as the result of the chemical reaction which occurs in performing the process.

It will be appreciated that the total amount of ethyl alcohol present in the solid product is small, being ordinarily something like 2%. This quantity of alcohol is entirely unobjectionable in most liquids, so that it is ordinarily unnecessary to separate the alcohol from the liquid transported after both have been separated from the solid mass in which they are held. This alcohol, however, may be readily separated from the liquid after the recovery thereof from the solid mass in the liquid form by fractional distillation, or otherwise, if desired.

It necessarily follows that if an alcoholate other than sodium ethylate is used, a different stearate and a different alcohol will result from the chemical action which follows the mixing of the two solutions. For example, if metallic potassium, or potassium hydroxid, be dissolved in an excess of methyl alcohol, potassium methylate will be produced, and the products produced by mixing the two solutions will be potassium stearate, and methyl alcohol; the potassium stearate being a jelly-like mass which hardens upon cooling, much like and as good for the purposes of my process as the product produced from the ingredients first above referred to. Finally, if a fatty acid other than stearic acid be used (and I may say that I have secured good results, using palmitic acid), salts of the particular acid used will obviously be produced in performing the process.

In view of the premises it will be appreciated that I secure a distribution of the liquid treated and which it is designed to transport, throughout the mass of a solid and more or less hard mass of material produced by the chemical action which occurs when the solutions of stearic acid and sodium ethylate are mixed, and permitted to cool and jellify, from which it follows that leakage of the liquid during transportation cannot occur. A cheap and easily made container may therefore be used for shipping the liquid thus solidified, and the same need not have as tight and permanent joints as would be necessary for holding a liquid; for leakage of the solid mass cannot occur, and, if any portion thereof becomes exposed to the atmosphere, as because of a broken or an imperfect joint, there will be no leakage of liquid; and such evaporation as may take place from the exposed solid mass will be slight, and will speedily result in an increase in density of the portion exposed and a sort of a searing over of the portion of the solid mass exposed. If, again, the container becomes seriously injured or broken, so as to expose all or most of the contents thereof to the atmosphere, there will be no running about of a volatile and presumably inflammable liquid; and such evaporation as occurs will take place from the surface only of the solid and compact mass in which the liquid is distributed and held. Such evaporation will tend to be self limiting and, should the injury be of such an extent as to necessitate the sacrifice of the entire contents of the injured container, the said contents may be handled as a solid and compact or but little scattered mass and with none of the risk commonly incident to dealing with a like quantity of liquid in the liquid form. Even should the solid mass catch fire the results will not be at all serious, as the mass will burn slowly, and as a solid, and there will be no flowing of a burning liquid to spread the flames, as occurs when an inflammable liquid burns.

As an obvious modification of the procedure above outlined and one within the process or method of treatment in which my invention consists, the proper quantity of stearic acid may be dissolved in one portion of the liquid to be solidified, and the proper quantity of sodium ethylate or sodium ethylate solution in another portion of said liquid, and the two portions mixed together to produce the same ultimate result and product.

It will be appreciated that the stearic acid and sodium ethylate solutions may be heated to thereby facilitate the chemical action which occurs when they are mixed; and that if the mixing is performed in a receptacle other than that in which the product is to be shipped, the mixture will be transferred to suitable shipping or storing receptacles before the mixture cools and begins to solidify. Jellification or solidification of the mixture takes place quite gradually, as the mixture cools, and requires a little time. When, however, the mixture has jellified, and become hard, the product is extremely stable, and will not readily return to the liquid form under ordinary conditions, although it may be liquefied by heat as will hereinafter appear.

My improved process may for many purposes be regarded as completed upon the formation of the solid mass above referred to, as the product thus secured may be utilized as a solid in many ways, and for many uses for which the liquid is adapted; among which may be mentioned by burning the same as the ordinary "solid alcohol" of commerce is burned, or by using it as a source (by evaporation from its surface) of extremely volatile liquids such as chloroform, ether, carbon bisulfid, etc.

It is contemplated, however, that as a subsequent step of my process the liquid transported will be separated and recovered or removed from the solid mass in which it is held, so that it may be used in the liquid form; which separation may be accomplished in various ways, among which the following may be mentioned, either of which may be used according to the exigencies of the case or the equipment of the purchaser of the solid mass who may wish to separate the transported liquid therefrom and use it in the liquid form.

The treated liquid may be recovered from the solid mass after transportation by simply applying pressure thereto as by means of a suitable filter or other press, whereby the liquid is squeezed out of the solid mass; or, the solid mass may be liquefied by heat, and heated to such a temperature that the liquid is driven off as a vapor, and the vapor condensed, as in ordinary distillation processes. Again, the solid mass may be heated to such a degree as to liquefy it, and an ingredient then added to the liquefied solid which will form substances which are insoluble in the liquid transported, which insoluble ingredients may then be removed by decantation or filtration. Calcium chlorid is a substance which may be used in the specific example of my process hereinbefore set forth, which substance, when dissolved in ethyl alcohol and added to the liquefied solid, will react therewith to form calcium stearate and sodium chlorid, both of which are insoluble in the gasolene assumed to be the liquid solidified in the example given.

In all these cases the recovered liquid will obviously be mixed with the small quantity of ethyl alcohol produced in the reaction, and the excess used for solution of the active ingredient or ingredients employed. In the case of gasolene, kerosene, and various other liquids, this small amount of ethyl alcohol will in no way interfere with the ordinary uses of the transported liquid for burning purposes, and need not be removed therefrom. If ethyl alcohol is the liquid solidified, then the ethyl alcohol produced and added will be the same liquid as that solidified, and no account need be taken thereof; while if methyl alcohol is the liquid treated, the small quantity of ethyl alcohol present will ordinarily be unobjectionable, or, the solidification may be accomplished by the use of sodium methylate, in which case the liquid produced and added in working the process is again the same liquid as the liquid treated in the process. As a further example, if amyl alcohol is to be solidified, the process may be carried out by the use of sodium amylate, in which case, again, the liquid added and produced in the reaction is identical with the liquid solidified by the process. In all cases, however, in which the small quantity of liquid added and produced by the reaction is for any reason an objectionable ingredient in the liquid transported, the same may be readily separated from the liquid treated by fractional distillation, or otherwise, and the treated liquid recovered in its original form, and entirety, uncontaminated by the liquid produced in the reaction, or employed for the solution of the active materials employed in performing the process.

Having thus described my improved process and explained the manner in which the same may be performed, I claim and desire to secure by Letters Patent:—

1. The process of solidifying liquids which consists in dissolving a suitable fatty acid in the liquid to be solidified, and adding an alcoholate to the solution thus formed.

2. The process of solidifying liquids which consists in dissolving a suitable fatty acid in the liquid to be solidified, and adding sodium ethylate to the solution thus formed.

3. The process of solidifying liquids which consists in dissolving stearic acid in the liquid to be solidified, and adding sodium ethylate to the solution thus formed.

4. The process of solidifying liquids which consists in dissolving a suitable fatty acid in the liquid to be solidified, and adding a solution of an alcoholate in an excess of alcohol to said first mentioned solution.

5. The process of solidifying liquids which consists in dissolving a suitable fatty acid in the liquid to be solidified, and adding a solution of sodium ethylate in an excess of ethyl alcohol to said first mentioned solution.

6. The process of solidifying liquids which consists in dissolving stearic acid in the liquid to be solidified, and adding a solution of sodium ethylate in an excess of ethyl alcohol to said first mentioned solution.

7. The process of treating liquids which consists in dissolving a suitable fatty acid in the liquid to be treated, adding an alcoholate to the solution thus formed whereby a solid mass is formed, and separating the liquid treated from said solid mass.

8. The process of treating liquids which consists in dissolving stearic acid in the liquid to be treated, adding sodium ethylate to the solution thus formed whereby a solid mass is formed, and separating the liquid treated from said solid mass.

9. The process of treating liquids which consists in dissolving stearic acid in the liquid to be treated, adding a solution of an alcoholate in an excess of alcohol to said first mentioned solution whereby a solid mass is formed, and separating the liquid treated from said solid mass.

10. The process of treating liquids which consists in dissolving stearic acid in the liquid to be treated, adding a solution of sodium ethylate in an excess of ethyl alcohol to said first mentioned solution whereby a solid mass is formed, and separating the liquid treated from said solid mass.

In testimony whereof, I have signed my name to this specification this 3d day of January, 1917.

FREDERICK D. CRANE.